Dec. 17, 1957     E. V. KIRKLAND     2,816,743
STIRRER BEARING AND ADAPTOR
Filed April 29, 1955
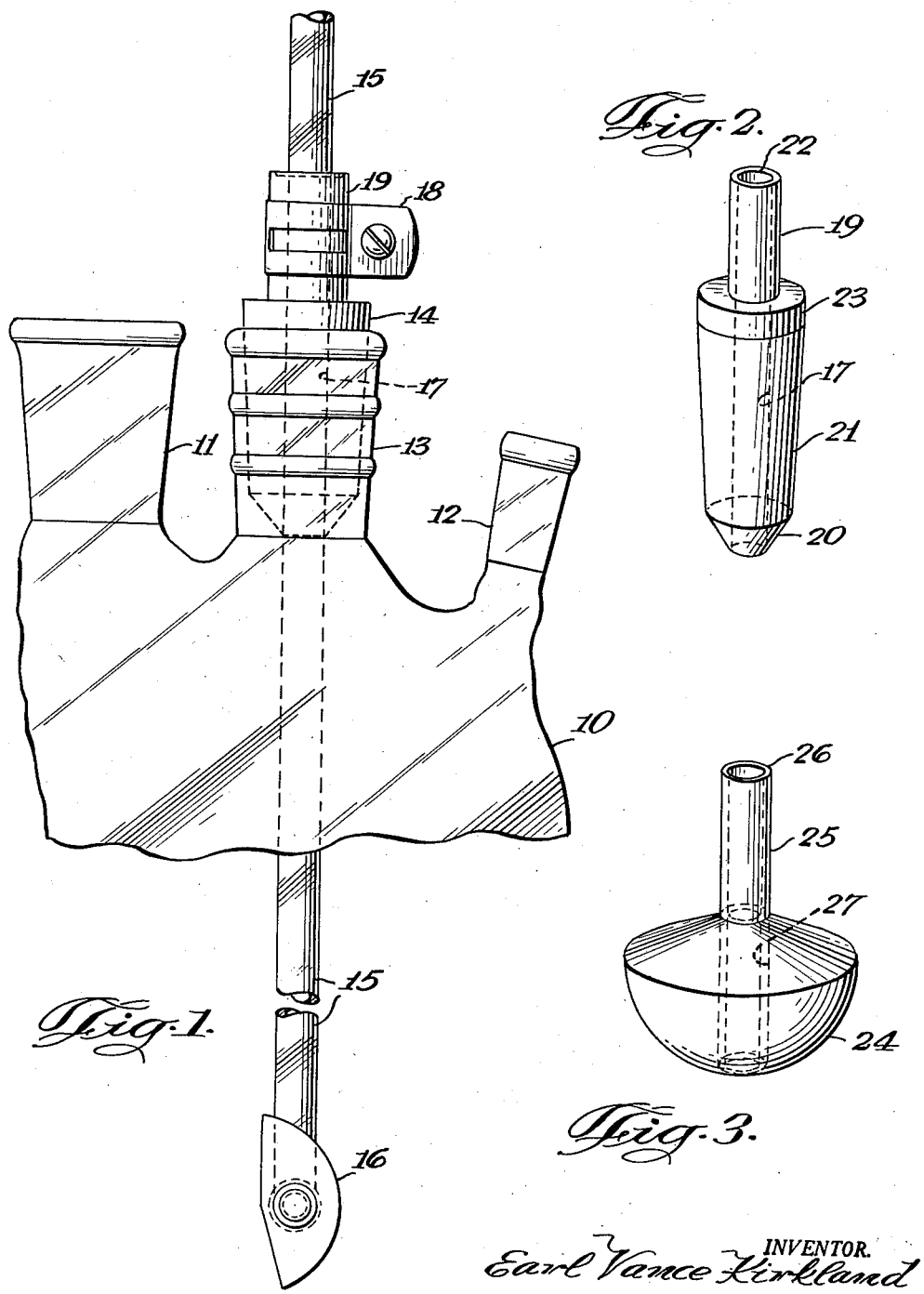
INVENTOR.
Earl Vance Kirkland
BY
Everett A. Johnson
attorney

United States Patent Office 2,816,743
Patented Dec. 17, 1957

2,816,743

STIRRER BEARING AND ADAPTOR

Earl Vance Kirkland, La Marque, Tex., assignor to The American Oil Company, Texas City, Tex., a corporation of Texas Application April 29, 1955, Serial No. 504,795

7 Claims. (Cl. 259—122)

This invention relates to a bearing-adaptor for laboratory ware and relates more particularly to such a device for use on glass laboratory equipment.

Heretofore, many different means have been proposed for use in the laboratory for introducing a stirrer into a reactor vessel. However, such arrangements have not been generally satisfactory from all standpoints, For example, when glass stoppers and glass stirring rods are used, there is excessive wear resulting in leakage and frequent breakage. Where glass is not used, it is necessary to make frequent replacements because of the solvent or corrosive action of the reactants and its vapors on stopper materials such as rubber and cork.

It is, therefore, a primary object of my invention to provide a combination bearing and adaptor which avoids these difficulties. A further object of the invention is to provide a bearing and adaptor which is essentially self-lubricating. An additional object of the invention is to provide an apparatus which is not subject to breakage or corrosion. These and other objects of the invention will become apparent as the description thereof proceeds.

Briefly, my invention comprises a bearing, the lower part of which is shaped so that it will provide a fluid-tight fit on a standard taper or ball joints of glass or metal. A bore drilled or molded through the center of the bearing accommodates the stirrer shaft and a relatively thin and flexible sleeve portion is provided which may be compressed about the stirrer shaft with a suitable clamp to give a gas-tight seal. I prefer to use an inert, self-lubricating material, such as Teflon (polytetrafluoethylene), which is sufficiently flexible so that the bore need not be to exact tolerances. If desired, a liquid reservoir may be built into the top of the bearing to supply a lubricant and/or sealing liquid between the stirrer shaft and the bearing.

The optimum wall thickness of the bearing sleeve at the top of the adaptor varies with different materials, but should be sufficient to hold its shape and thin enough that it can be compressed about the shaft to give a tight seal. In general, walls of between about 1 mm. and about 3 mm., preferably about 2 mm., are satisfactory. Heavier walls may be used, but greater clamping pressure is required to obtain an effective seal between the bearing and the stirrer shaft. When using Teflon, I prefer to provide walls which are about 2 mm. thick.

Further details of the invention will be described in connection with the accompanying drawings wherein:

Figure 1 is a fragmentary view of the bearing and stirrer shaft in place on a reactor;

Figure 2 illustrates one embodiment of the bearing adapted for use on a tapered joint; and Figure 3 illustrates a stirrer bearing designed for use on a ball joint.

Referring to the drawings, the reactor 10 is provided with the usual inlet 11 and thermometer well 12. The neck 13 comprises a standard tapered glass joint which receives the bearing 14, embodiments of which are shown in Figures 2 and 3. The stirrer shaft 15, having an impeller 16, extends through the bore 17 of the bearing-adaptor 14. A clamp 18 is disposed about the sealing sleeve portion 19 of the bearing 14 to give a gas-tight seal as described.

Referring to Figure 2, the bearing-adaptor comprises a convex bottom end 20 and a tapered body portion 21, an upper shaft sealing sleeve 19 and a concave channel 22 at the upper end of the sleeve 19. It should be understood, however, that any dimenisons may be used. However, I have found that a thick-walled or massive stopper section 21 and a flexible thin-walled sleeve 19 is very satisfactory.

In a typical bearing, the sleeve 19 may be about 25 mm. in length and have a wall thickness of about 2 mm. The tapered portion 21 may taper from about 25 mm. O. D. to about 20 mm. O. D. over a length of 40 mm. A cylindrical cap 23 of about 6 mm. in length and 25 mm. O. D. can be provided between the sleeve 19 and the tapered stopper portion 21 as shown. The bore 17 within the stopper 21 and sleeve 19 may suitably be about 8 mm. in length I. D.

In Figure 3, another embodiment of the stirrer bearing, including a ball joint stopper section 24 and the sleeve section 25, is illustrated. In this embodiment, the sealing portion of the ball stopper 24 may be about 50 mm. in diameter and the sleeve 25 may be about 30 mm. in length. The illustrated design includes a sleeve wall thickness of about 2 mm., the bore 26 having an I. D. of about 8 mm.

Another embodiment of the invention may comprise a stopper section 21 or 24 of ground glass or the like and an internal bore 27 adapted to receive a deformable sleeve 25 as shown in Figure 3 which is of substantially greater length than the over-all height of the stopper section. If desired, threads may be molded on the outside of the sleeve and the inside of the stopper so that there will be a gas-tight seal therebetween. It is contemplated, therefore, that either of the bearing adaptors illustrated in Figures 2 and 3 may be fabricated from a glass or plastic stopper portion 21 and 24 with a separable flexible sleeve bushing 25 secured within the stopper portion.

It is further contemplated that the gas-sealing characteristics of the deformable sleeve may be enhanced by underreaming portions of the internal wall of the sleeve, by fluting the outer surface of the wall, and by grooving the wall longitudinally, leaving a thinner wall portion intact. Thus, by the underreaming technique, one leaves a series of longitudinally spaced annular ribs which are at closer tolerances than the major portion of the bore, thereby providing a plurality of barriers which are in essentially wiping contact with the rotated shaft. The longitudinal fluting provides the necessary stiffness while requiring lesser pressures for collapsing the sleeve onto the stirrer shaft. Finally, the longitudinal notch permits peripheral compression of the sleeve while retaining the minimum wall thickness necessary for contact with the stirring shaft.

My invention has been described with reference to particular embodiments, but it should be understood that these are by way of illustration only and that the invention is not necessarily limited thereto. In any event, other modifications of the apparatus will become apparent to those skilled in the art in view of my description and such can be made without departing from the spirit of the invention.

What I claim is:

1. A shaft bearing and flask adaptor comprising in combination a massive tapered stopper, a shaft-receiving bore through said stopper, a sleeve extending from the upper face of said stopper in axial alignment with said bore, said sleeve having a thin deformable wall, a shaft extending through said stopper and said sleeve, and sleeve-encircling means for collapsing said sleeve into fluid-sealing contact with said shaft extending through said stopper and said sleeve.

2. A combination stirrer bearing and flask seal which comprises a massive stopper portion and an elongated stirrer sealing portion, said stirrer sealing portion comprising a sleeve portion having a thin deformable wall and being integral with the body of said stopper portion, and means encircling said sleeve portion adapted to facilitate the deformation of the said wall to reduce the effective inner diameter of said sleeve portion.

3. The apparatus of claim 2 wherein the flask-sealing surface of the stopper portion has a standard taper.

4. A fluid-tight shaft bushing and vessel adaptor comprising in combination a massive stopper portion, a bore extending axially through said stopper portion, a sleeve extending axially of said bore and having a portion extending above said stopper portion, said sleeve having a relatively thin deformable wall, a shaft extending into said sleeve, and sleeve-encircling means for deforming the portion of said sleeve above said stopper portion into contact with said shaft to provide a fluid-tight bushing therefor.

5. The apparatus of claim 4 wherein the stopper portion comprises the male portion of a ball joint.

6. An apparatus adapted to function as a stopper, a bearing for a stirring shaft, and as a seal for said shaft, which comprises in combination a stopper portion, a shaft receiving bore through said stopper portion, a deformable sleeve integral with and superposing said stopper portion and extending axially of said bore a distance of at least one-half the length of said bore, and clamping means about said sleeve adapted to deform said sleeve into wiping contact with a stirrer shaft extending through said bore and sleeve.

7. The bushing and adaptor of claim 4 wherein said stopper portion has a standard taper and wherein said sleeve-encircling means is separable from said stopper portion.

References Cited in the file of this patent

UNITED STATES PATENTS

| 2,190,220 | Schilling | Feb. 13, 1940 |
| 2,535,856 | Luertzing | Dec. 26, 1950 |
| 2,660,518 | White | Nov. 24, 1953 |

FOREIGN PATENTS

| 464,261 | Canada | Apr. 11, 1950 |
| 606,749 | Great Britain | Aug. 19, 1948 |
| 656,657 | Great Britain | Aug. 29, 1951 |
| 687,430 | Great Britain | Feb. 11, 1953 |